United States Patent
Nishioka

(10) Patent No.: US 9,322,431 B2
(45) Date of Patent: Apr. 26, 2016

(54) SLIDE RAIL AND IMAGE FORMING APPARATUS

(71) Applicant: KYOCERA DOCUMENT SOLUTIONS INC., Osaka (JP)

(72) Inventor: Nobuhiro Nishioka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 34 days.

(21) Appl. No.: 14/015,789

(22) Filed: Aug. 30, 2013

(65) Prior Publication Data

US 2014/0062282 A1 Mar. 6, 2014

(30) Foreign Application Priority Data

Aug. 31, 2012 (JP) .................................. 2012-192592

(51) Int. Cl.
- *F16C 29/00* (2006.01)
- *G03G 21/16* (2006.01)
- *A47B 88/16* (2006.01)

(52) U.S. Cl.
CPC ............... *F16C 29/005* (2013.01); *A47B 88/16* (2013.01); *G03G 21/1623* (2013.01); *G03G 2221/1684* (2013.01)

(58) Field of Classification Search
USPC ........... 312/333, 334.1, 334.7–334.8, 334.11, 312/334.17, 334.44–334.46; 384/18, 21; 399/393
See application file for complete search history.

(56) References Cited

U.S. PATENT DOCUMENTS

| | | | |
|---|---|---|---|
| 5,577,821 A * | 11/1996 | Chu | 312/334.11 |
| 5,722,750 A * | 3/1998 | Chu | 312/334.11 |
| 6,220,683 B1 * | 4/2001 | Chu | 312/334.44 |
| 6,238,031 B1 * | 5/2001 | Weng | 312/333 |
| 6,257,683 B1 * | 7/2001 | Yang | 312/333 |
| 6,386,660 B1 * | 5/2002 | Yang | 312/334.46 |
| 6,402,275 B1 * | 6/2002 | Yang | 312/334.46 |
| 6,715,851 B1 * | 4/2004 | Yang | 312/334.46 |
| 8,528,999 B2 * | 9/2013 | Chen et al. | 312/334.45 |
| 2002/0043915 A1 * | 4/2002 | Chan | 312/334.46 |
| 2002/0175605 A1 * | 11/2002 | Chen et al. | 312/333 |

FOREIGN PATENT DOCUMENTS

| | | |
|---|---|---|
| JP | S53-137921 U | 10/1978 |
| JP | 2001-304255 A | 10/2001 |
| JP | 2005-173522 A | 6/2005 |
| JP | 2007-000253 A | 1/2007 |
| JP | 2011-107575 A | 6/2011 |
| JP | 2011-159716 A | 8/2011 |
| JP | 2011-172830 A | 9/2011 |

OTHER PUBLICATIONS

An Office Action; "Notice of Reasons for Rejection," issued by the Japanese Patent Office on Oct. 7, 2014, which corresponds to Japanese Patent Application No. 2012-192592 and is related to U.S. Appl. No. 14/015,789.

* cited by examiner

*Primary Examiner* — Daniel Rohrhoff
*Assistant Examiner* — Ryan A Doyle
(74) *Attorney, Agent, or Firm* — Studebaker & Brackett PC

(57) ABSTRACT

A slide rail includes a plurality of ball retainers, a fixed rail, and a moving rail. The moving rail is capable of being inserted into and drawn out from the fixed rail by being pulled frontward of the fixed rail to be taken out from the plurality of ball retainers or by being inserted into the plurality of ball retainers from front. The plurality of ball retainers are arranged in the sliding direction along the fixed rail. The plurality of ball retainers include a guide retainer arranged on a front end part of the fixed rail. The fixed rail includes a restriction member configured to restrict sliding of the guide retainer rearward of the fixed rail.

10 Claims, 6 Drawing Sheets

SLIDE RAIL AND IMAGE FORMING APPARATUS

INCORPORATION BY REFERENCE

The present application claims priority under 35 U.S.C. §119 to Japanese Patent Application No. 2012-192592, filed Aug. 31, 2012. The contents of this application are incorporated herein by reference in their entirety.

BACKGROUND

The present disclosure relates to slide rails and image forming apparatuses.

For sheet feed cassettes in image forming apparatuses, such as copiers, etc., slide rails are provided to facilitate putting in/taking out, that is, insertion/drawing of the sheet feed cassettes relative to the main bodies of the image forming apparatuses. Besides this, in drawers for furniture and kitchens, slide rails are also provided to facilitate putting in/taking out, that is, insertion/drawing of the drawers from their corresponding main bodies. As such a slide rail, for example, a structure has been known which is provided with a fixed rail having a substantially C-shaped cross section fixed at an equipment main body of an image forming apparatus and a moving rail having a substantially C-shaped cross section slidably held by the fixed rail through a ball retainer that includes ball bearings.

A recent demand is that sheet feed cassettes, drawers, and the like are detachable from their corresponding main bodies in an operation, such as maintenance. In order to be detachable, some type of slide rail includes a support member on the inner surface of the front end part of the fixed rail to support the front end part of the moving rail. In the support member, a support protrusion is formed which protrudes toward the moving rail and being in contact with a bent edge of the moving rail.

SUMMARY

A slide rail according to the present disclosure includes a plurality of ball retainers, a fixed rail, and a moving rail. The plurality of ball retainers include ball bearings. The fixed rail is provided so that the plurality of ball retainers slide in a sliding direction. The moving rail is arranged in the fixed rail and is configured to engage with the ball bearings to be slidable relative to the plurality of ball retainers. The moving rail is capable of being inserted into and drawn out from the fixed rail by being pulled frontward of the fixed rail to be taken out from the plurality of ball retainers or by being inserted into the plurality of ball retainers from front.

The plurality of ball retainers are arranged in the sliding direction along the fixed rail. The plurality of ball retainers include a guide retainer arranged on a front end part of the fixed rail. The fixed rail includes a restriction member configured to restrict sliding of the guide retainer rearward of the fixed rail.

An image forming apparatus according to the present invention includes a main body, an image forming section, a fixing section, and a drawer member. The image forming section and the fixing section are provided in an interior of the main body. The drawer member is capable of being drawn from the main body. The drawer member is accommodated so as to be capable of being inserted in and drawn from the main body through the aforementioned slide rail.

DETAILED DESCRIPTION

Embodiments of the present disclosure will be described below with reference to the accompanying drawings. It is noted that each members are appropriately changed in scale in the below-mentioned drawings so as to be recognizable.

Figure 1:
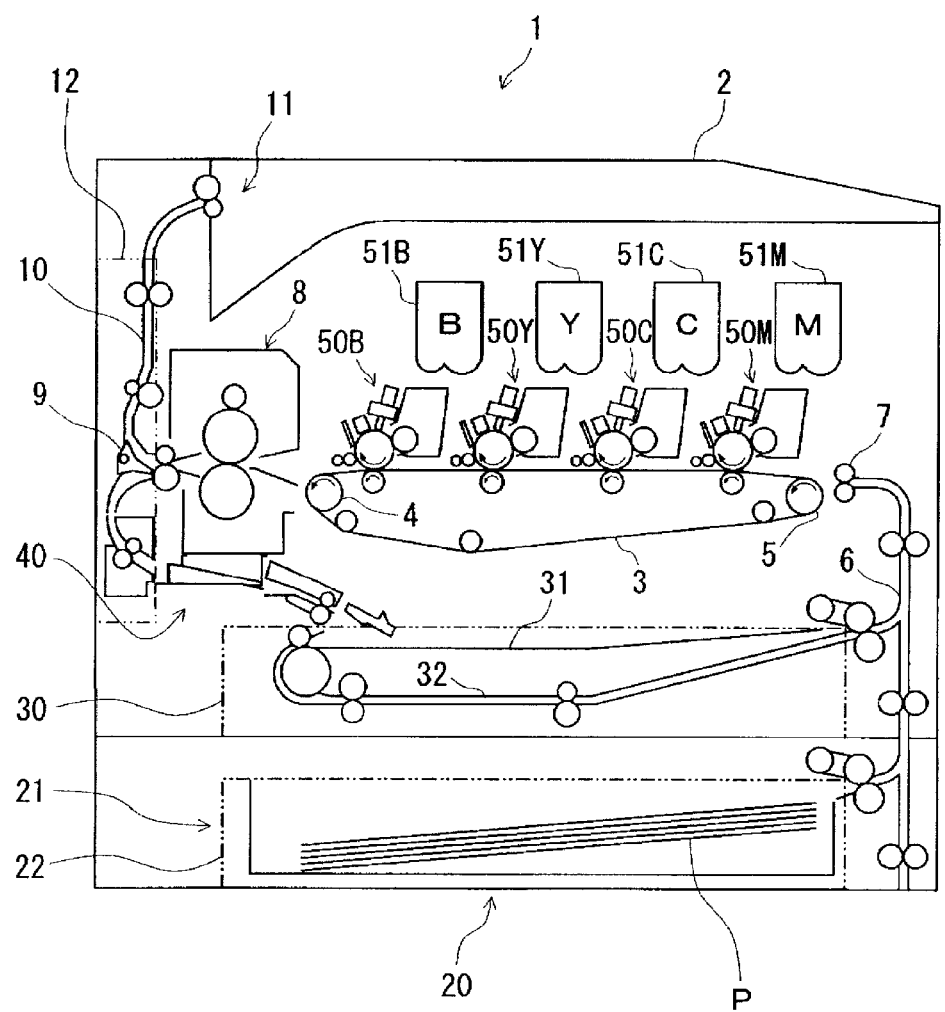
FIG. 1 is a configuration diagram schematically showing a printer according to one embodiment of the present disclosure.

First of all, an image forming apparatus according to one embodiment of the present disclosure will be described roughly with reference to FIG. 1. FIG. 1 is a vertical front cross sectional view schematically showing a configuration of a tandem type color printer as one example of the image forming apparatus.

In a printer 1 in FIG. 1, either full color image output or monochrome image output is selected according to color information of original document image data from an external computer.

A transfer/conveyance belt 3 is disposed in the interior of a main body 2 of the printer 1. The transfer/conveyance belt 3 is wound between and supported by a drive roller 4 and a driven roller 5. The transfer/conveyance belt 3 conveys a sheet P horizontally from right to left in FIG. 1. The transfer/conveyance belt 3 is used for transferring a toner image to the sheet P. A sheet feeder 20, a sheet conveyance path 6, and a registration roller 7 are arranged on the upstream side in a sheet conveyance direction of the transfer/conveyance belt 3. A fixing section 8, a branch section 9, a sheet conveyance path 10, and an ejection section 11 are disposed on the downstream side of the transfer/conveyance belt 3. The ejection section 11 is arranged on the top surface of the main body 2.

A duplex printing unit 30 is disposed below the transfer/conveyance belt 3 between the transfer/conveyance belt 3 and the sheet feeder 20. The duplex printing unit 30 includes an intermediate tray 31 and a sheet conveyance path 32. The intermediate tray 31 switches the conveyance direction for the sheet P. In the present embodiment, the duplex printing unit 30 and the sheet feed cassette 22 in the sheet feeder 20 serve as drawer members capable of being pulled out from the main body 2.

Four image forming sections are arranged above the transfer/conveyance belt 3 in series from the upstream side to the downstream side in the sheet conveyance direction. The four image forming sections are a magenta image forming section 50M, a cyan image forming section 50C, a yellow image forming section 50Y, and a black image forming section 50B in the order from the upstream side. In order to replenish the image forming sections with toner, toner supply containers 51M, 51C, 51Y, 51B are provided for the image forming sections 50M, 50C, 50Y, 50B, respectively, so that each image forming section is replenished with toner by a conveyance means (not shown).

On the left side of the main body 2, a side cover 12 is provided which is capable of exposing the fixing section 8, the branch section 9, and the sheet conveyance path 10. The side cover 12 is turnable about its lower end as a rotation axis with its upper end serving as a free end.

The printer 1 configured as above performs an image output operation as follows.

The sheet P, which is sent from the sheet feeder 20 through the sheet conveyance path 6, reaches the registration roller 7. The registration roller 7 sends the sheet P onto the transfer/conveyance belt 3 in synchronization with each image forming section. The image forming sections 50M, 50C, 50Y, 50B transfer magenta, cyan, yellow, and black toner images, respectively, to the sheet P sequentially, thereby forming a color image on the sheet P.

Then, the sheet P carrying the non-fixed color toner image is sent to the fixing section 8. Thereafter, the toner is heated and melted by a heating roller in the interior of the fixing section 8 to be fixed to the sheet P. The sheet P ejected from the fixing section 8 passes through the branch section 9 and the sheet conveyance path 10 and is then ejected onto the ejection section 11 provided on the upper surface of the main body 2.

For duplex printing, the conveyance direction for the sheet P is changed downward in the branch section 9. The sheet P sent downward from the branch section 9 passes through the conveyance unit 40 and goes from left to right in FIG. 1 onto the intermediate tray 31 provided in the duplex printing unit 30 to be stored thereon temporarily. Next, the conveyance direction for the sheet P is switched to left. Then, the sheet P is sent again to the registration roller 7 through the sheet conveyance path 32.

A slide rail according to one embodiment of the present disclosure will be described next.

As described above, in the present embodiment, the sheet feed cassette 22 of the sheet feeder 20 and the duplex printing unit 30 are the drawer members capable of being drawn out from the main body 2. Slide rails are mounted between the sheet feed cassette 22 and the main body 2 and between the duplex printing unit 30 and the main body 2. That is, the sheet feed cassette 22 and the duplex printing unit 30 are accommodated in the main body 2 so as to be capable of being inserted into and drawn out from the main body 2 through the slide rails.

Figure 2:
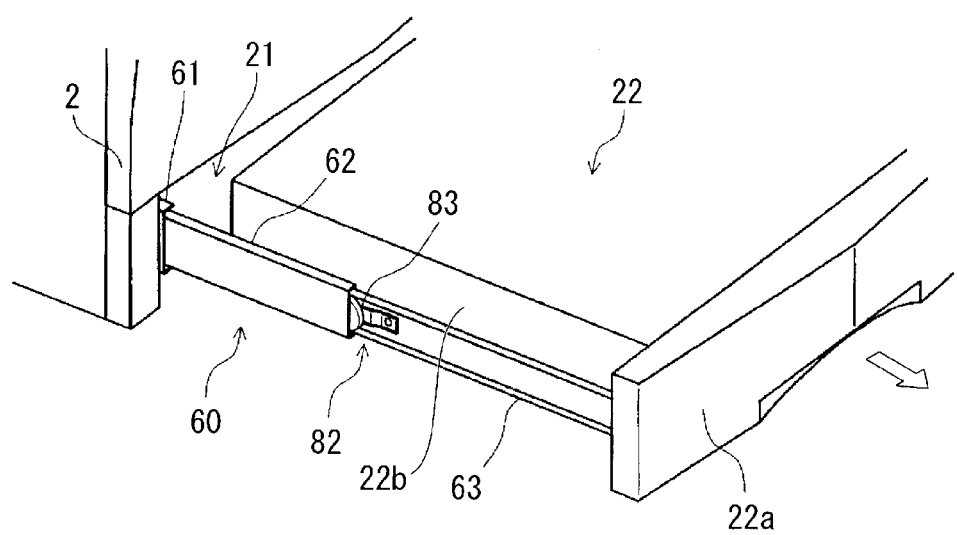
FIG. 2 is a perspective view showing the main part and the vicinity of a part where a slide rail is mounted.

FIG. 2 is an illustration for explaining the state in which the sheet feed cassette 22 is pulled out from the main body 2. FIG. 2 is a perspective view showing the main part and the vicinity of a part where a slide rail 60 is mounted. As shown in FIG. 2, a sheet feed cassette accommodating section 21 is formed in the lower part of the main body 2 of the printer 1. The sheet feed cassette 22 is provided in the interior of the sheet feed cassette accommodating section 21. The sheet feed cassette 22 is connected to and supported by the sheet feed cassette accommodating section 21 in the main body 2 and is accommodated in the interior of the sheet feed cassette accommodating section 21 so as to be capable of being inserted and drawn through the slide rail 60. The slide rail 60 is arranged and mounted on a side surface a cassette main body 22b. The sheet feed cassette 22 is capable of being drawn out in a manner that the front part of the sheet feed cassette 22, that is, a front panel 22a mounted on the front surface of the cassette main body 22b is pulled horizontally frontward, as indicated by the arrow in FIG. 2.

The slide rail 60 is mounted on a side surface of the sheet feed cassette 22 between the sheet feed cassette 22 and the sheet feed cassette accommodating section 21 in the lower part of the main body 2. It is noted that the slide rail 60 is arranged so that the obverse side and the reverse side of the slide rail 60 face outward and inward, respectively. Accordingly, the obverse side is shown in FIG. 2.

Figure 3:
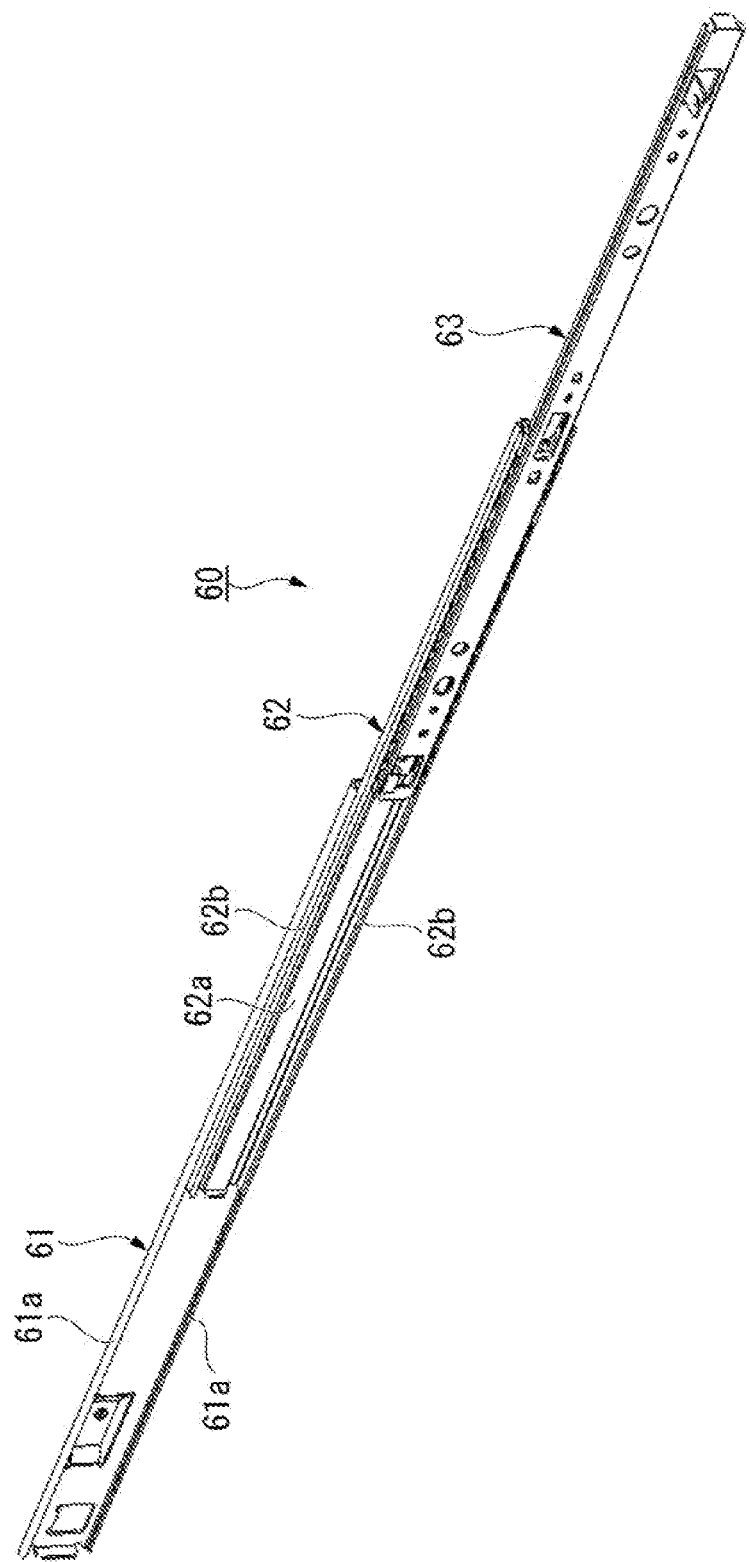
FIG. 3 is a perspective view showing a schematic configuration of the slide rail.

FIG. 3 is an illustration showing a schematic configuration of the slide rail 60. FIG. 3 is a perspective view of the slide rail 60 as viewed from another side. The slide rail 60 in the present embodiment includes an outer rail 61, a middle rail 62, and an inner rail 63. The outer rail 61 and the middle rail 62 form a fixed rail according to the present disclosure. The inner rail 63 forms a moving rail according to the present disclosure. As shown in FIG. 2, the outer rail 61 is mounted on the main body 2 in the interior of the sheet feed cassette accommodating section 21. By contrast, the inner rail 63 is mounted on the side surface of the sheet feed cassette 22 (on the side surface of the cassette main body 22b in the example shown in FIG. 2).

Figures 4A, 4B:
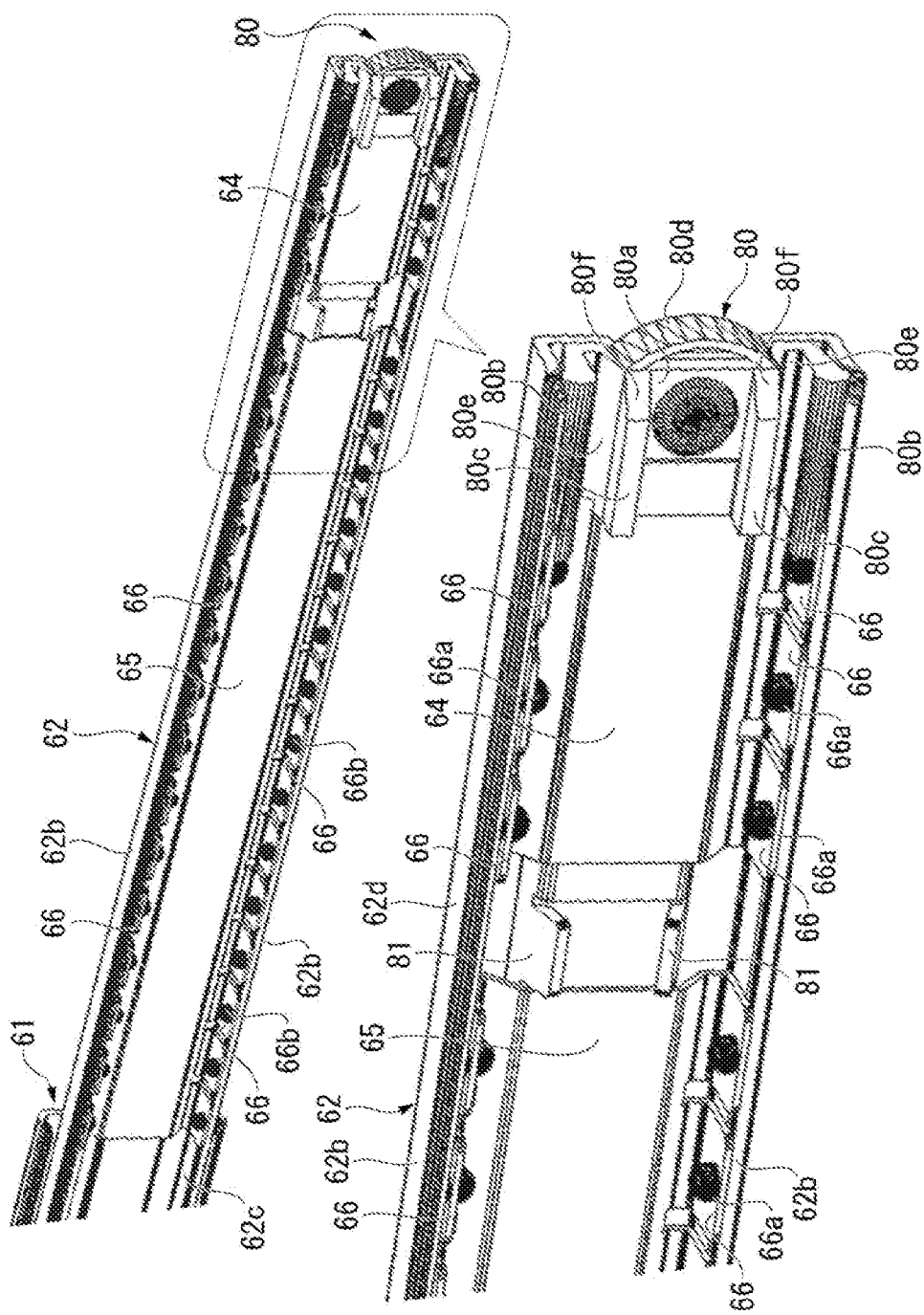
FIG. 4A is an illustration showing the inner side of a middle rail.
FIG. 4B is an enlarged view of the main part of FIG. 4A.

As shown in FIG. 3, the outer rail 61 is a slender metal plate-like rail having a substantially C-shaped transverse cross section. The middle rail 62 is slidably held in the interior of the outer rail 61, that is, between a bent edge 61a and a bent edge 61a, which are formed on the opposite side parts of the outer rail 61. The middle rail 62 is a metal rail having a substantially C-shaped transverse cross section that is slightly smaller than that of the outer rail 61. The middle rail 62 is a slender plate-like rail with a length almost equal to that of the outer rail 61. A protrusion 62a protruding toward the reverse side and extending in the length direction (sliding direction) of the plate is formed on the slender plate of the middle rail 62. The bent edges 62b, which are bent toward the reverse side, are formed on the opposite side parts of the plate of the middle rail 62. As shown in FIG. 4A, which shows the reverse side of the middle rail 62, and FIG. 4B, which is an enlarged view of the main part on the inner side of the middle rail 62, linear sliding grooves 62c, 62d are formed in the inner and outer parts of the respective bent edges 62b, respectively, so that a small diameter ball can roll in the sliding direction.

Two (plural) metal ball retainers 64, 65 are provided in the middle rail 62, that is, between the two bend edges 62b. The ball retainers 64, 65 are each formed of a comparatively thin metal plate member having a substantially C shape slightly smaller than the middle rail 62. The ball retainers 64, 65 each include a plurality of ball bearings 66. The ball bearings 66 are arranged at predetermined intervals in the sliding direction in parts of the middle rail 62, which face the respective bent edges 62b. Balls 66a are rotatably held by the bearings 66. The ball retainers 64, 65 are inserted in the middle rail 62 in a manner that the balls 66a of the ball bearings 66 engage with the respective sliding groove 62c inside the two bent edges 62b.

With the above configuration, the balls 66a roll on the respective grooves 62c inside the two bent edges 62b of the middle rail 62, so that the ball retainers 64, 65 can freely slide in the sliding direction along the middle rail 62. The respective balls 66a of the ball bearings 66 also face the sliding grooves 62c, which are linearly formed in the longitudinal direction and allow the inner rail 63 to slide, on the inner sides of the bent edges 62b. This enables the inner rail 63 to be slidable relative to the middle rail 62. In addition, though not shown, linear sliding grooves are formed inside the two bent edges 61a of the outer rail 61. A ball retainer similar to the ball retainer 64 is provided at the outer rail 61. Ball bearings of the ball retainer face the respective sliding grooves inside the bent edges 61a and the sliding grove 62c of the middle rail 62. The middle rail 62 is held so as to be slidable relative to the outer rail 61.

Moreover, the ball retainer 64 of the ball retainers 64, 65 serves as a guide retainer 64 arranged at the front end part of the middle rail 62, that is, on the side of the front panel 22a in FIG. 2. As shown in FIGS. 4A and 4B, the guide retainer (ball retainer) 64 includes three ball bearings 66 on each of the opposite sides thereof and is short enough when compared with the other ball retainer 65. The guide retainer 64 is arranged at the front end part of the middle rail 62 so as to be slidable within a predetermined range. Further, the other ball retainer 65 has a length about one half of that of the middle rail 62, for example.

A guide member 80 is mounted and fixed by means of a bolt or the like on the further front side than the guide retainer 64 in the front end part of the middle rail 62, that is, the foremost end of the middle rail 62. The guide member 80 guides the inner rail 63 in mounting the inner rail 63 on the middle rail 62. Further, the guide member 80 also functions as a restriction member that restricts frontward sliding of the guide retainer 64.

Furthermore, a pair of restriction members 81 is provided at the middle rail 62. The pair of restriction members 81 is provided at a part which is closer to the center of the middle rail 62 in the sliding direction (length direction) than the guide member 80. The pair of restriction members 81 restricts sliding of the guide retainer 64 toward the center (rearward of the middle rail 62 (fixed rail)). The pair of restriction members 81 is formed by raising parts of the protrusion 62a of the middle rail 62. However, the restriction members may be protrusions mounted by means of a bolt, welding, adhesive, or the like, or may be directly formed with a bolt.

The guide retainer 64 is interposed between the restriction members 81 and the guide member 80. For this reason, the guide retainer 64 is slidable in the sliding direction along the middle rail 62 only within the predetermined range restricted by the restriction members 81 and the guide member 80. The predetermined range is a range of about 1 to 2 cm, for example, within which the guide retainer 64 can move in the sliding direction along the middle rail 62. That is, the distance between the restriction members 81 and the guide member 80 is about 1 to 2 cm longer than the length of the guide retainer 64.

It is noted that as a restriction member that defines the slidable range (predetermined range) of the guide retainer 64, for example, a long hole is formed in the central part of the guide retainer 64, and a protrusion, such as a blot or the like to engage with the long hole is formed so as to movable relative to the long hole.

The guide member 80 is a resin member including a mounting plate 80a, a pair of fitting protrusions 80b, a pair of support protrusions 80c, and a cushioning portion 80d. The pair of fitting protrusions 80b is formed on the opposite sides of the mounting plate 80a. The pair of support protrusions 80c is formed closer to the center of the guide member 80 than the pair of fitting protrusions 80b. The cushioning portion 80d is an arc-shaped member formed at the tip end of the mounting plate 80a. Grooves 80e between the fitting protrusions 80b and the support protrusions 80c of the guide member 80 each serve as a guide portion to receive the tip end part of the inner rail 63, that is, a part thereof on the opposite side to the front panel 22a shown in FIG. 2. Further, as shown in FIG. 4B, each one of the end surfaces 80f of the two support protrusions 80c, that is, the end surface 80f of each support protrusion 80c on the front side of the middle rail 62 inclines so as to be close to the center of the middle rail 62 as it goes away from the mounting plate 80a.

The grooves 80e are opened into the guide retainer 64. Accordingly, the inner rail 63 going along the groove 80e is directly guided to the guide retainer 64 to slide. Here, the width and depth of the groves 80e of the guide member 80 are larger than the thickness and length of bent edges 63a of the inner rail 63, which will be described later. Accordingly, frictional drag, which would prevent the inner rail 63 from sliding, is less caused. Further, the protruding surfaces of the support protrusions 80c are out of contact with the inner rail 63 with a predetermined interval left.

Figures 5A, 5B:
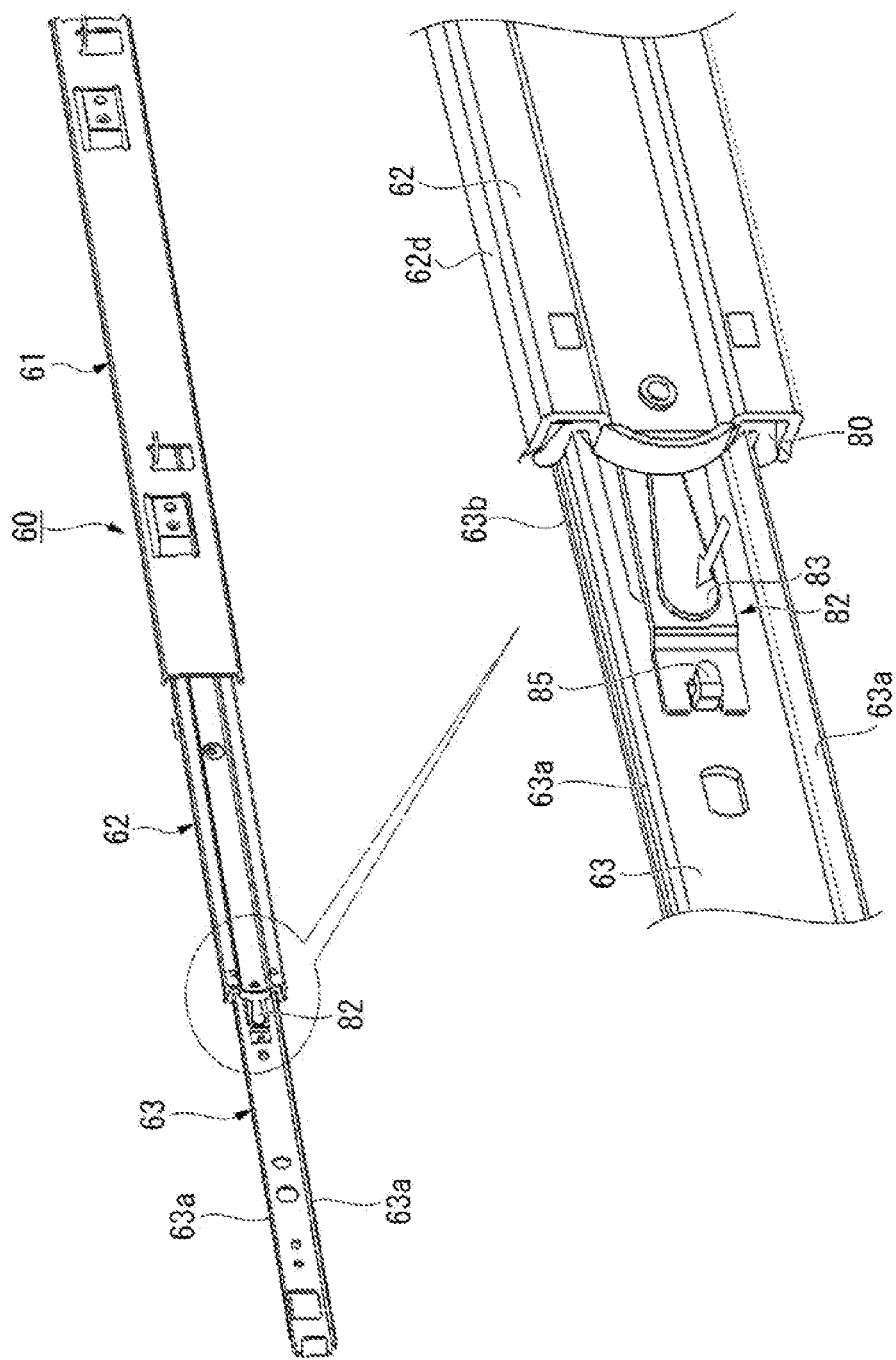
FIG. 5A is a perspective view of the slide rail as viewed from its obverse side.
FIG. 5B is an enlarged view of the main part of FIG. 5A.

FIG. 5A is a perspective view of the slide rail 60 as viewed from the obverse side. As shown in FIG. 5A, the inner rail 63 is a metal member having a substantially C-shaped transvers cross section smaller than the middle rail 62. The inner rail 63 is a slender plate-like member with a length almost equal to that of the middle rail 62. The bent edges 63a are formed on the opposite sides of the slender plate. Each of the two bent edges 63a is formed to extend toward the middle rail 62. A linear slide groove 63b is formed in the longitudinal direction in each of the outer surfaces of the two bent edges 63a. The balls 66a are held by the ball bearings 66 of the guide retainer 64 and the ball retainer 65. The bent edges 63a are guided to the grooves 80e of the guide member 80 and engage then with the balls 66a to slide on the grooves 80e.

Figure 6:
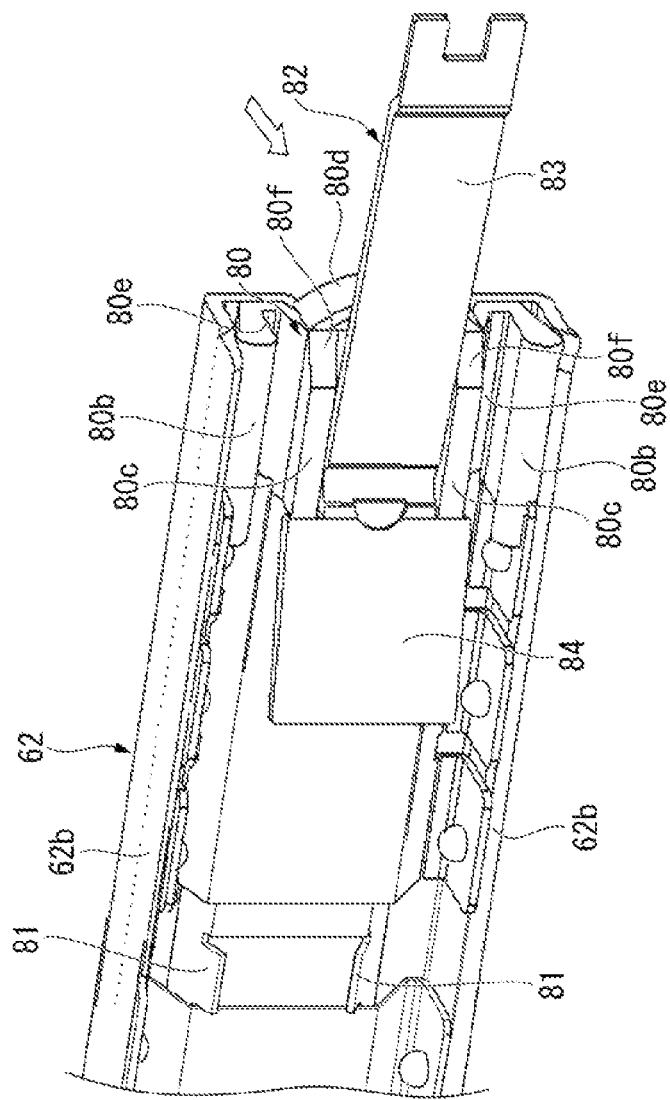
FIG. 6 is an illustration showing the inner side of the middle rail.

FIG. 5B is an enlarged view of the main part in FIG. 5A. As shown in FIG. 5B, the inner rail 63 is provided with a locking member 82 that locks the inner rail 63 in the middle rail 62. The locking member 82 can prevent the inner rail 63 from falling off from the middle rail 62. The locking member 82 is a slender flexible plate-like member made of resin. FIG. 6 is a view showing the inner side of the middle rail 62 with the locking member 82, from which the inner rail 63 is taken out. As shown in FIG. 6, the locking member 82 includes a slender plate-like support portion 83 and a functional portion 84. The functional portion 84 is substantially square in shape.

The locking member 82 is bent in a manner that the support portion 83 and the functional portion 84 form an L shape in combination to form an angle when viewed from a side. That is, the locking member 82 is formed in a manner that both the ends of the locking member 82 are in contact with the inner rail 63, while the central part thereof separate from the inner rail 63.

As shown in FIG. 5B, the support portion 83 has one end, which engages with and is held by a protrusion piece 85 for mounting formed at the inner rail 63. Further, as shown in FIG. 6, the support portion 83 is formed to have a width that allows the support portion 83 so as to be capable of passing between the two support protrusions 80c of the guide member 80 and be movable between the two support protrusions 80c.

On the other hand, the functional portion 84 is formed wider than the support portion 83. Therefore, each end of the two support protrusions 80c of the guide member 80 catches the end of the functional portion 84 on the side of the support portion 83, so that the functional portion 84 cannot pass between the two support protrusions 80c.

As indicated by the arrows in FIGS. 6 and 5B, when the support portion 83 is pushed from the obverse side toward the reverse side of the slide rail 60, the locking member 82 becomes flat along the surface on the outer side of the inner rail 63 from the bent L shape. As a result, the support portion 83 and the functional portion 84 recede toward the inner rail 63 more than the protruding surfaces of the support protrusions 80c of the guide member 80. Thus, the functional portion 84 caught by the two support protrusions 80c is released.

Description will be made next about an operation of the slide rail 60 configured as above.

In order to take out, for example, the sheet feed cassette 22 from the sheet feed cassette accommodating section 21 shown in FIG. 2 in the printer shown in FIG. 1, the sheet feed cassette 22 is pulled out in the direction indicated by the arrow in FIG. 2. The middle rail 62 is slidably held by the outer rail 61. The inner rail 63 is slidably held by the middle rail 62 through the guide retainer 64 and the ball retainer 65. Accordingly, the sheet feed cassette 22 can be easily and smoothly drawn out from the sheet feed cassette accommodating section 21.

However, the inner rail 63 is provided with the locking member 82. As such, the functional portion 84 of the locking member 82 is caught by the support protrusions 80c of the guide member 80, as shown in FIG. 6. Thus, the inner rail 63 is incapable of being drawn out from the middle rail 62 farther more. It is noted that in this state, the support portion 83 of the locking member 82 is exposed on the obverse side of the slide rail 60, as shown in FIG. 2.

Accordingly, an operator pushes the support portion 83 in the direction indicated by the arrows in FIGS. 6 and 5B, that is, toward the inner rail 63. Then, as described above, this makes the functional portion 84 to recede toward the inner rail 63 more than the protruding surfaces of the support protrusions 80c of the guide member 80, thereby releasing catch of the functional portion 84 by the two support protrusions 80c. Accordingly, when the sheet feed cassette 22 is further pulled out in this state, the sheet feed cassette 22 can be taken out from the sheet feed cassette accommodating section 21. That is, the inner rail 63 can be taken out from the middle rail 62.

In order to accommodate again the sheet feed cassette 22 in the sheet feed cassette accommodating section 21 after the sheet feed cassette 22 is taken out in this manner, the tip end parts of the two bent edges 63a of the inner rail 63 are aligned with the grooves 80e of the guide member 80 of the middle rail 62. Then, the sheet feed cassette 22 is pushed into the sheet feed cassette accommodating section 21 in this state. This makes the tip end of the inner rail 63 to be guided to the grooves 80e of the guide member 80 and directly to the ball bearings 66 of the guide retainer 64. Thus, since the guide retainer 64 is arranged on the front end part of the middle rail 62 to open into the grooves 80e, the tip end parts of the two bent edges 63a of the inner rail 63 can be smoothly guided to the ball bearings 66 of the guide retainer 64.

The guide retainer 64 is slidable within the predetermined range. Accordingly, the tip end part of the inner rail 63, which is guided to the ball bearings 66 of the guide retainer 64, can be more smoothly inserted into the middle rail 62 with the aid of both sliding of the inner rail 63 relative to the guide retainer 64 and sliding of the guide retainer 64 relative to the middle rail 62.

The tip end part of the inner rail 63, which is inserted as above in the ball bearings 66 of the guide retainer 64, slides directly and horizontally through the middle rail 62 to be guided by the ball bearings 66 of the ball retainer 65 to slide. That is, the inner rail 63 moves in the sliding direction along the middle rail 62. In so doing, the inner rail 63 moves more smoothly through the middle rail 62 with the aid of both sliding of itself relative to the ball retainer 65 and sliding of the ball retainer 65 relative to the middle rail 62.

Still further, in moving the inner rail 63 along the middle rail 62 as above, the locking member 82 of the inner rail 63 receives no pressure, and accordingly, remains in the bent L shape as shown in FIG. 6. Accordingly, the functional portion 84 of the locking member 82, which is located on the tip end side in the moving direction of the inner rail 63, inclines in a manner that its tip end is in contact with the inner rail 63, while the part on the side of the support portion 83 separates from the inner rail 63. Thus, the functional portion 84 on the tip end side of the locking member 82 forms the inclined surface. Also, each end surface 80f of the support protrusions 80c of the guide member 80 forms the inclined surface. Accordingly, when the inner rail 63 is inserted in and moved along the middle rail 62, the locking member 82 can easily ride over the two support protrusions 80c of the guide member 80.

Thereafter, when the functional portion 84 of the locking member 82 comes in contact with the support protrusions 80c of the guide member 80 after riding on and passing over the end surfaces 80f of the support protrusions 80c, the inclined surface of the functional portion 84 is pushed by the support protrusions 80c to be flat. Subsequently, the inner rail 63 moves in the sliding direction along the middle rail 62 in this state, so that the locking member 82 passes over the support protrusions 80c of the guide member 80 to be returned to the original bent L shape.

When the sheet feed cassette 22 is pushed further toward the sheet feed cassette accommodating section 21, the middle rail 62 also slides along the outer rail 61. Finally, the middle rail 62 is accommodated in the outer rail 61. The inner rail 63 is accommodated in the middle rail 62. Thus, the sheet feed cassette 22 is accommodated in the sheet feed cassette accommodating section 21.

The two ball retainers 64, 65 are arranged in the sliding direction along the middle rail 62 in the above slide rail 60. One of the ball retainers 64, 65 serves as the guide retainer 64 arranged at the front end part of the middle rail 62. Accordingly, arrangement of the guide retainer 64 always at the front end part of the middle rail 62 enables easy confirmation by sight of the guide retainer 64 in inserting and fitting the inner rail 63 into the middle rail 62. Thus, insertion of the inner rail 63 into this guide retainer 64 can result in easy fitting of the inner rail 63 into the middle rail 62.

Furthermore, the guide retainer 64 includes the ball bearings 66. Accordingly, frictional drag is hardly caused between the guide retainer 64 and the inner rail 63, which can allow the inner rail 63 to favorably slide, thereby achieving favorable sliding performance. Thus, the sheet feed cassette 22, on which this inner rail 63 is mounted, can be inserted and fitted into the sheet feed cassette accommodating section 21 easily and smoothly. Further, favorable sliding performance of the sheet feed cassette 22 can be achieved.

Yet further, the guide retainer 64 is arranged so as to be slidable within the predetermined range in the front end part of the middle rail 62. Accordingly, the guide retainer 64 slides along the middle rail 62 in inserting the inner rail 63 in the guide retainer 64, thereby resulting in more favorable sliding of the inner rail 63. Thus, more favorable sliding performance of the inner rail 63 can be achieved.

Moreover, the three ball bearings are disposed on each of the opposite sides of the guide retainer 64. Accordingly, the guide retainer 64 comes in contact at its six points with the middle rail 62. This means that the guide retainer 64 can be stably held by the middle rail 62 with less inclination and torsion. Thus, the guide retainer 64 can cause less backlash of the inner rail 63. As a result, the inner rail 63 can be smoothly guided in the sliding direction along the middle rail 62.

Still further, the guide retainer 64 is shorter than the other ball retainer 65 to form the other ball retainer 65 longer. Accordingly, in inserting the inner rail 63 into the middle rail 62, the inner rail 63 can favorably slide along the middle rail 62 through the relatively long ball retainer 65. Thus, the inner rail 63 can exhibit more favorable sliding performance.

Moreover, the guide member 80 is provided at the end of the middle rail 62, which is located further frontward of the guide retainer 64. This can guide the inner rail 63 easily to the guide retainer 64 through the guide member 80. Thus, the inner rail 63 can be fitted into the middle rail 62 easily.

Yet further, the fixed rail includes the middle rail 62 and the outer rail 61. This can make the stroke of the entire slide rail 60 large. Accordingly, even in the case of a drawer member (sheet feed cassette 22) having a great depth, the drawing distance of this drawer member can be set large.

Furthermore, in the printer 1 (image forming apparatus) in the present embodiment, the drawer members can be accommodated in the main body 2 easily with favorable sliding performance.

The preferable embodiment has been described above with reference to the drawings. However, the present disclosure is not limited to the above embodiment. The shapes, combinations, etc. of the component members described in the above embodiment are mere examples and can be modified in various manners on the basis of design requirement and the like within the scope of the subject matter of the present disclosure.

The slide rail 60 according to the present disclosure is mounted between the sheet feed cassette 22 and the main body 2 in the above embodiment as one example. However, the slide rail 60 may be mounted between the duplex printing unit 30 and the main body 2, for example. Further, the slide rail 60 may be mounted between a drawer (drawer member) and a main body of furniture or a kitchen, rather than the image forming apparatus (printer 1).

Moreover, the fixed rail includes the middle rail 62 and the outer rail 61 in the above embodiment. However, in the case where not so large stroke is needed, the fixed rail may include only the middle rail 62. In this case, the middle rail 62 serves as a rail directly fixed to a fixed member.

Yet further, the two ball retainers 64, 65 are provided at the middle rail 62 in the above embodiment. However, three or more ball retainers may be provided.

Still further, although the three ball bearings 66 are provided in the sliding direction in the guide retainer 64, two or four or more ball bearings 66 may be provided therein.

Furthermore, the printer is described in the above embodiment as one example of the image forming apparatus. However, the present disclosure is applicable to any other image forming apparatuses, such as copiers, etc. for example.

Yet further, in the above embodiment, the sliding direction is the same as the longitudinal direction of the fixed rail and the moving rail, which however should not be taken to limit the present disclosure. The sliding direction may be different from the longitudinal direction of the fixed rail and the moving rail. For example, the sliding direction may be the normal direction of the longitudinal direction of the fixed rail and the moving rail.

What is claimed is:

1. A slide rail, comprising:
   a plurality of plate-shaped ball retainers including ball bearings each holding a ball;
   a fixed rail on which the plurality of plate-shaped ball retainers are provided slidably in a sliding direction; and
   a moving rail arranged in the fixed rail and configured to engage with the ball bearings to be slidable relative to the plurality of plate-shaped ball retainers,
   wherein the fixed rail includes an engaging rail that engages with the ball bearings of the plurality of plate-shaped ball retainers,
   the moving rail is capable of being inserted into and drawn out from the engaging rail by being pulled frontward of the engaging rail to be taken out from the plurality of plate-shaped ball retainers or by being inserted into the plurality of plate-shaped ball retainers from front,
   the plurality of plate-shaped ball retainers aligned in one line in the sliding direction along the fixed rail,
   the plurality of plate-shaped ball retainers include a guide retainer arranged on a front end part of the engaging rail and an adjacent ball retainer rearwardly adjacent to the guide retainer in the sliding direction in the engaging rail,
   the engaging rail includes a restriction member located between the guide retainer and the adjacent ball retainer in the sliding direction,
   the guide retainer is located between the front end part of the engaging rail and the restriction member,
   the adjacent ball retainer is located between a rear end part of the engaging rail and the restriction member, and
   the restriction member restricts sliding of the guide retainer rearward of the engaging rail and sliding of the adjacent ball retainer frontward of the engaging rail.

2. The slide rail of claim 1, wherein
   the guide retainer is arranged so as to be slidable within a predetermined range in the front end part.

3. The slide rail of claim 1, wherein
   the guide retainer includes two or more ball bearings arranged in the sliding direction.

4. The slide rail of claim 1, wherein
   the guide retainer has a length in the sliding direction shorter than the other of the ball retainers other than the guide retainer.

5. The slide rail of claim 1, further comprising:
   a guide member provided at a front end of the engaging rail which is located further frontward than the guide retainer, and configured to guide insertion of the moving rail and restrict frontward sliding of the guide retainer.

6. The slide rail of claim 1, wherein
   the fixed rail further includes an accommodating rail that accommodates the engaging rail,
   the fixed rail includes an outer rail as the accommodating rail mounted on a fixed member and a middle rail as the engaging rail provided in the outer rail so as to be slidable in the sliding direction, and
   the plurality of plate-shaped ball retainers are provided at the middle rail.

7. The slide rail of claim 1, wherein
   the fixed rail has a substantially C-shaped transverse cross section.

8. The slide rail of claim 1, further comprising
   a locking member configured to lock the engaging rail in the moving rail,
   wherein the moving rail is capable of being inserted into and drawn out from the fixed rail by being pulled frontward of the fixed rail upon release of the locking member to be taken out from the plurality of plate-shaped ball retainers or by being inserted into the plurality of plate-shaped ball retainers from front.

9. The slide rail of claim 1, wherein
   the guide retainer guides insertion of the moving rail without moving from the front end part of the engaging rail.

10. An image forming apparatus, comprising:
    a main body;
    an image forming section and a fixing section, which are provided in an interior of the main body; and
    a drawer member capable of being drawn from the main body, wherein the drawer member is accommodated so as to be capable of being inserted in and drawn from the main body through the slide rail of claim 1.

* * * * *